United States Patent [19]
Yamagami

[11] Patent Number: 4,538,144
[45] Date of Patent: Aug. 27, 1985

[54] GRAPHIC DISPLAY DEVICE HAVING GRAPHIC GENERATOR FOR SHADING GRAPHS

[75] Inventor: Nobuhiko Yamagami, Fuchu, Japan

[73] Assignee: Tokyo Shibaura Denki Kabushiki Kaisha, Kawasaki, Japan

[21] Appl. No.: 340,387

[22] Filed: Jan. 18, 1982

[30] Foreign Application Priority Data

Jan. 16, 1981 [JP] Japan .................................. 56-4662

[51] Int. Cl.³ .............................................. G09G 1/16
[52] U.S. Cl. ................................... 340/747; 340/729; 340/722; 340/793
[58] Field of Search ............... 340/703, 722, 793, 729, 340/749, 747

[56] References Cited

U.S. PATENT DOCUMENTS 3,778,811 12/1973 Gicca ................................... 340/722
3,925,776 12/1975 Swallow ............................. 340/703
3,944,997 3/1976 Swallow ............................. 340/703

Primary Examiner—Marshall M. Curtis
Attorney, Agent, or Firm—Oblon, Fisher, Spivak, McClelland & Maier

[57] ABSTRACT

A graphic display device for shading the region between one straight line $L_1$ connecting two points $P_1$ and $P_2$ and another straight line $L_2$ parallel to the Y axis or the X axis, including a straight line coordinates generator to define a line $L_1$ which connects the two points $P_1$ and $P_2$, an X or Y coordinates generator to count X or Y coordinates from a point $T_t$ on the line $L_1$ given by the straight line coordinates generator in a predetermined direction, a controller for signalling the straight line coordinates generator when the X or Y coordinates generator completes generation of the coordinates for a selected shading line, a detector for detecting the intersections of the lines $L_1$ and $L_2$ in accordance with the number of the lattice points designated to provide shading on a selected shading line, a changer for changing the counting direction of the X or Y coordinates generator after detecting the intersection of the lines $L_1$ and $L_2$, and a shading display device to shade a region between the lines $L_1$ and $L_2$ in accordance with the coordinates of the lattice points designated to provide shading as designated by the straight line coordinates generator and the X or Y coordinates generator for the shading lines. The graphic display device sequentially generates shading lines parallel to either the X-axis or the Y-axis lightening the designated lattice points of a CRT or an X-Y plotter until all of the area between the two lines is shaded, thus simplifying the circuit architecture of the device.

8 Claims, 11 Drawing Figures

GRAPHIC DISPLAY DEVICE HAVING GRAPHIC GENERATOR FOR SHADING GRAPHS

BACKGROUND OF THE INVENTION

1. Field of the Invention

This invention relates to a raster scan type cathode ray tube (CRT) display device for displaying characters and graphs, and more particularly relates to a graphic generator for shading graphs.

2. Description of the Prior Art

Shading capabilities have been developed for the graphic displays provided by raster scan type CRT display devices which enhances user interface with the computer.

As shown in FIG. 1, in the prior art, the shading operations are performed to shade regions defined by one straight line $L_1$ connecting two points $P_1$ and $P_2$ and another straight line $L_2$ parrallel to the Y axis (or X axis). As is currently being done in the field of the raster scan type graphic display devices, the displaying regions are divided into small equal sections as shown in FIG. 2 and it must be determined whether each section is to be lightened or not. In this case, the graphic display device simulates all graphs, including straight lines, by displaying (lightening) a group of the section. The graphic display device stores the information to lighten the sections in the memory regions corresponding to the display regions. The graphic display device provides the axes information to lighten the sections according to the information in the memory of the controller to generate the graphic display. Therefore, it is very important how the graphic display device provides the axes information for the shading.

In the prior art, there are two methods used to obtain the axes information for the shading. One method calculates all the axes of the sections to be lightened by microprocessors and the other separately processes two regions by hardware modules to shade a right-angle triangle. In these methods, at least the axes of an intersection $P_3$ must be calculated and it therefore takes a long time to process. If the line $L_1$ does not cross the line $L_2$, it is necessary to operate using other hardware and programs.

SUMMARY OF THE INVENTION

It is accordingly a principal object of this invention to provide a new and improved graphic display device of the raster scan type for shading graphs.

It is another object of the invention to provide a new and improved graphic display device for high speed shading.

It is still another object of the invention to provide a new and improved graphic display device to shade a region between a line $L_1$ connecting two points $P_1$ and $P_2$ and a line $L_2$, which is parallel to the X axis or Y axis, by common hardware independent of the relation between the positions of the two lines $L_1$ and $L_2$.

In order to obtain the above objects the graphic display device for shading includes:

a straight line coordinates generator for generating each coordinate in order from a point $P_1$ to a point $P_2$ of a line $L_1$ and connecting the two points $P_1$ and $P_2$, a shading line coordinates generator to count the coordinates from the point $P_t$ on the line $L_1$ given by the straight line corrdinates generator towards a predetermined direction to the line $L_2$ and to generate coordinates of the lattice points to be lightened to produce the shading lines, a controller for signalling the straight line coordinates generator upon completion of the coordinates count for a respective shading line, a detector for detecting intersections of the line $L_1$ and the line $L_2$ in accordance with the number of lattice points to be lightened on the shading line, a direction changer for changing the direction of counting of the shading line coordinates generator after the detector detects the line intersection, and a shading generator for shading a region between the lines $L_1$ and the lines $L_2$ in accordance with the coordinates of the points to be lightened as generated by the shading line coordinates generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
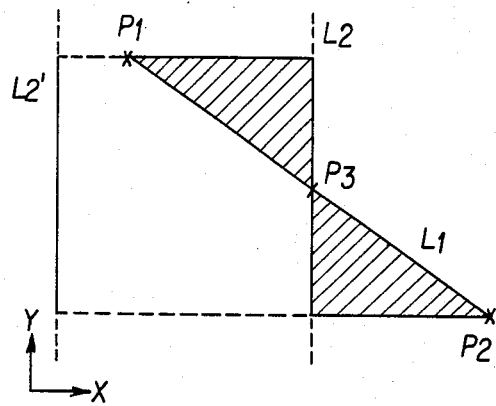
Fig. 1 is a graphical representation to explain a graphic display device for shading of the prior art.
Figure 2:
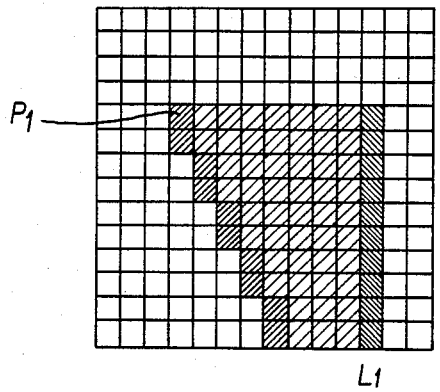
FIG. 2 is a graphical representation of data derived from the graph shown in FIG. 1.
Figure 3:
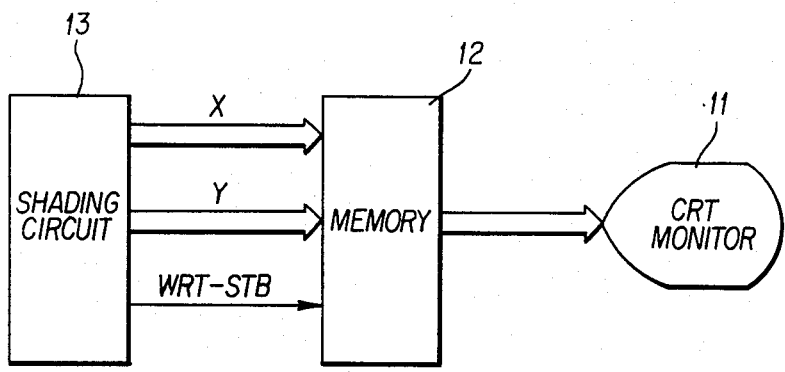
FIG. 3 is a block diagram of the present invention.
Figure 4:
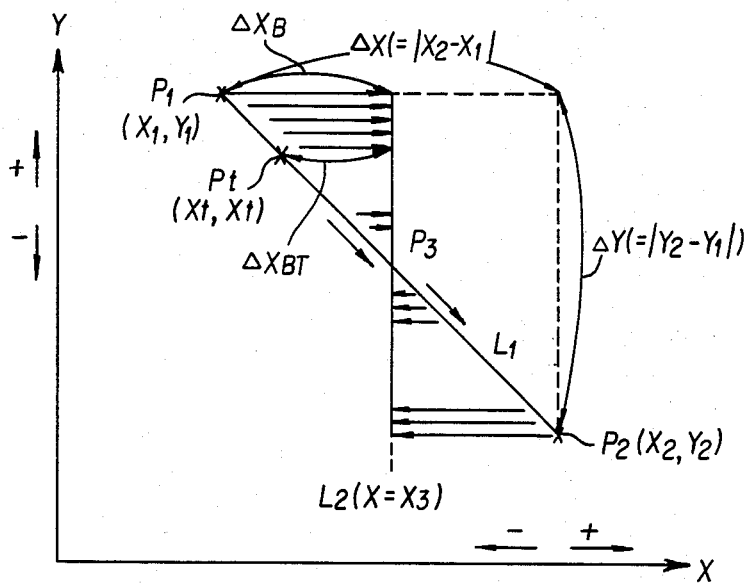
FIG. 4 is a graphical representation to explain the present invention.

Referring now to the drawings, wherein like reference numerals designate identical or corresponding parts throughout the several views, and more particularly to FIG. 3 and FIG. 4 thereof, the graphic display device is shown in block diagram form. However, the processor controlling these circuits is not shown. A memory 12 stores information to lighten each display section as a lattice point for the display screen of the CRT monitor 11. The shading circuit 13 writes the lighten information to the memory 12. The shading circuit generates the X and Y coordinates for the sections to be lightened and generates write strobe signals to determine the time to write.

Before explaining the actual shading circuit, the features of the operational steps for shading in referring to FIG. 4 will be explained to facilitate understanding of the invention. The shading circuit determines the coordinates of each point to be lightened from the point $P_1$ to the intersection of the line $L_1$ with the line $L_2$ and writes the coordinates of each point to be lightened at each of the write strobe signals. When the shading reaches the line $L_2$, namely $\Delta X_B$ (see FIG. 4) is equal to zero, and the coordinates of the next shading line are then determined starting from the coordinates $(X_t, Y_t)$ of the next closest point $P_t$ (as determined by the straight line generator) to the point $P_1$ on the line $L_1$ in the direction shown by the arrow. The shading line is generated by advancing from the point $P_t$ in the same direction along the X axis as shown by the arrows to determine every X coordinate between $L_1$ and $L_2$ and to write the lighten information, for instance "1", to the corresponding location of the memory 12. It repeats this operation until the point $P_2$ is reached. It should be noted that a straight line generator such as a that disclosed in the the Hewlett-Packard Journal, Jan. 1978 issue, pages 9 through 16.

Figure 5:
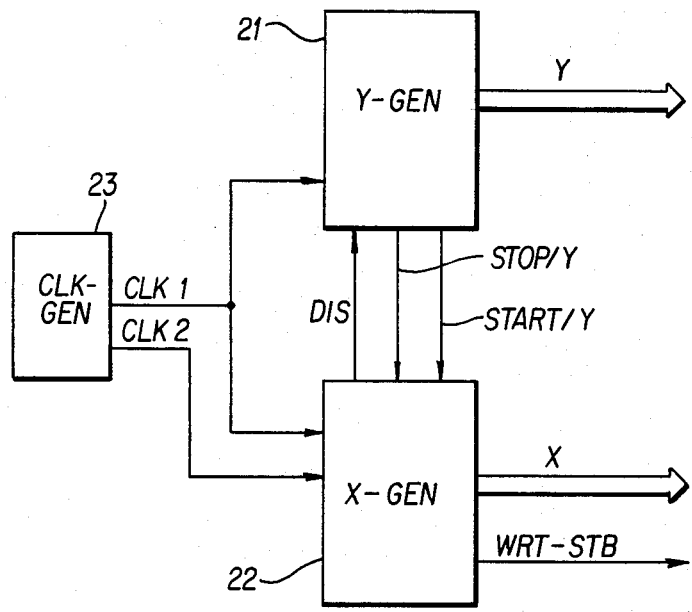
FIG. 5 is a block diagram of the shading circuit for the present invention.

FIG. 5 shows a block diagram of the shading circuit 13 having the operational functions as explained above. In FIG. 5, a Y coordinates generator 21 generates the Y coordinates of the lightened points and is simply called hereinafter the Y-GEN 21. An X coordinates generator 22 generates the X coordinates of the lightened points and the write-strobe signals (WRT-STB) and is called the X-GEN 22. A clock generator 23, hereinafter called the CLK-GEN, generates two basic clock signals $CLK_1$ and $CLK_2$. If the Y-GEN 21 is not receiving an inhibiting signal (DIS) from the X-GEN 22, and if it is necessary, it outputs a starting signal (START/Y) in synchronization with $CLK_1$, and it increments (or decrements) the Y coordinates. The Y-GEN 21 outputs a stop signal (STOP/Y) when the Y coordinate is coincident to the point $P_2$ in FIG. 4. If $\Delta X_{Bt}(X_3-X)$ is equal to zero, the X-GEN 22 begins to determine the new point $P_t$ on the line $L_1$ at the next timing of the clock $CLK_2$. If the Y-GEN 21 outputs the start signal (START/Y), or if the X-GEN 22 generates a corresponding control pulse to the start signal (START/Y) in itself, the X-GEN 22 increments (or decrements) the X coordinates in responding to the clock signal ($CLK_2$). The X-GEN 22 outputs a stop signal (STOP/X) when its X coordinate is coincident with the point $P_2$. The X-GEN 22 stops its operation after it detects all of the coordinates, when the Y-GEN 21 outputs the stop signal (STOP/Y) and when it generates the stop signal (STOP/X) internally.

Figure 6:
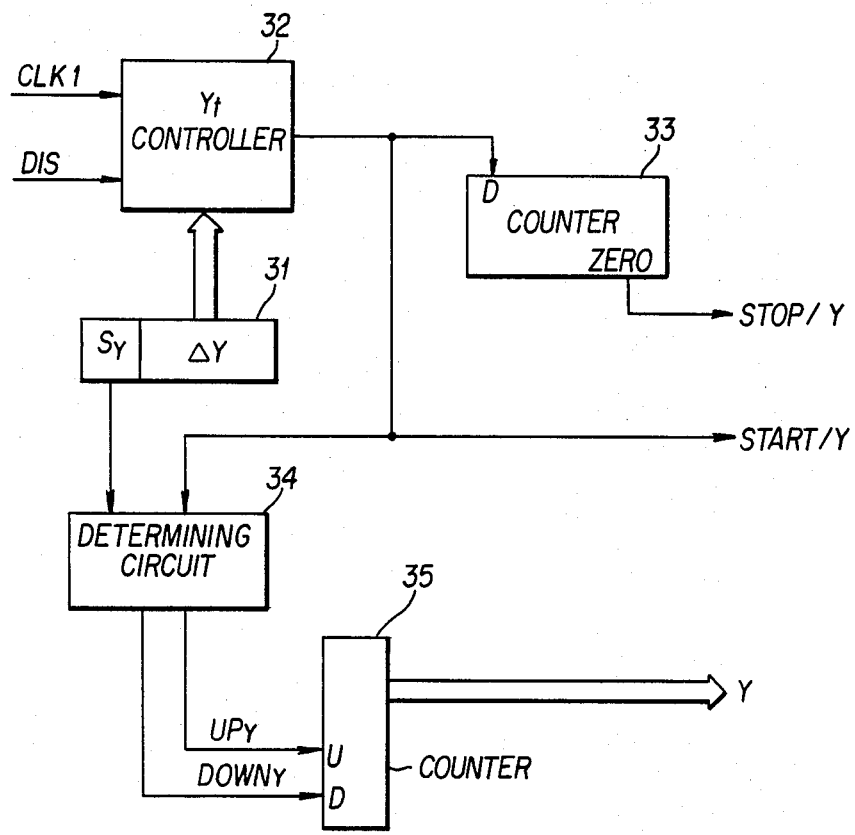
FIG. 6 is a block diagram for the Y coordinates generator of the shading circuit of FIG. 5.
Figure 7:
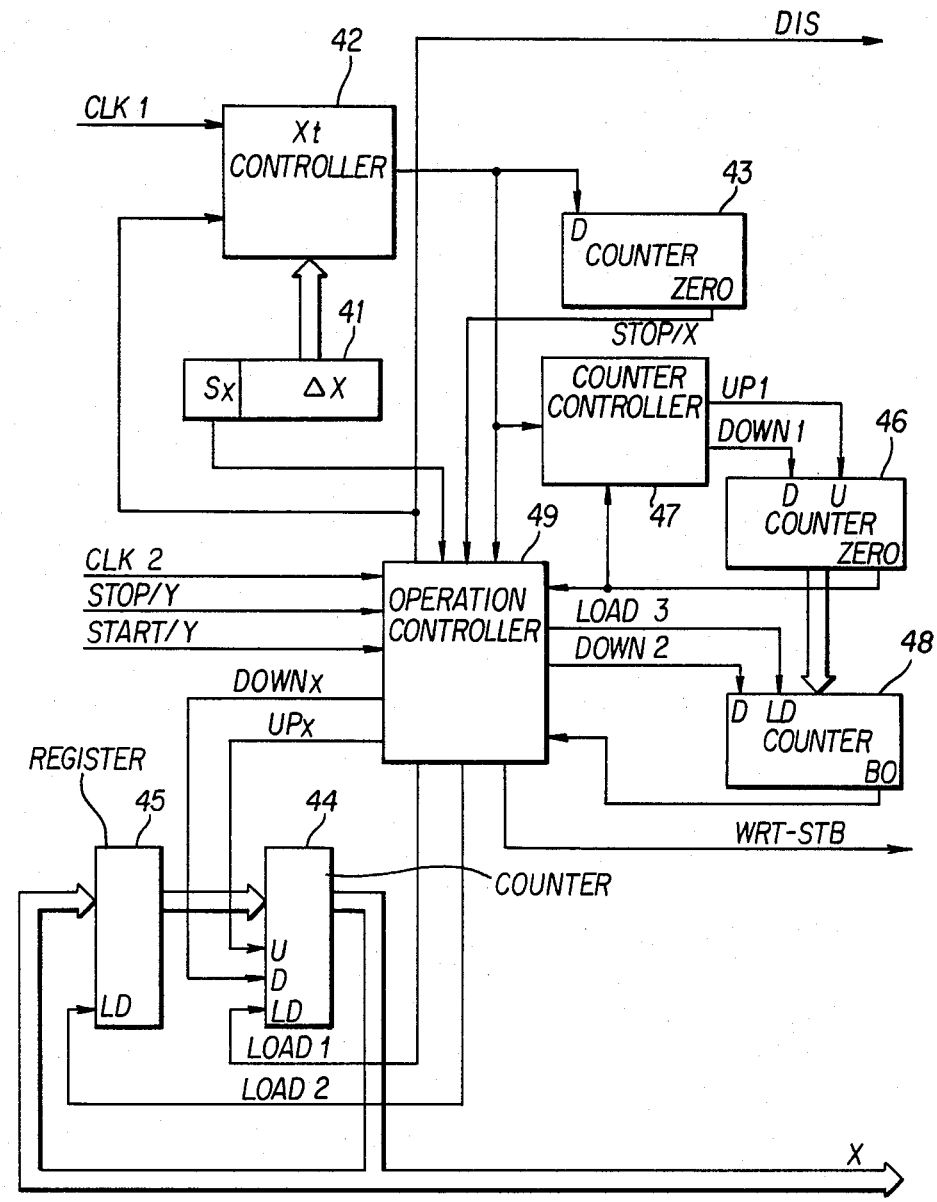
FIG. 7 is a block diagram of the X coordinates generator of the shading circuit of FIG. 5.
Figure 8:
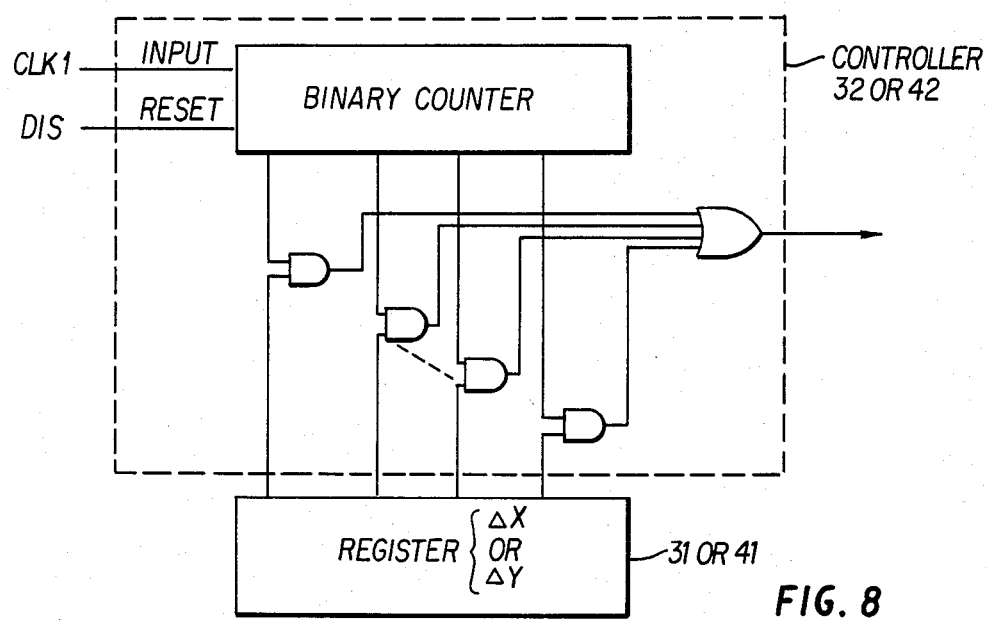
FIG. 8 is a circuit diagram for the Y+ controller of FIG. 6 and the X+ controller of FIG. 7.
Figure 9:
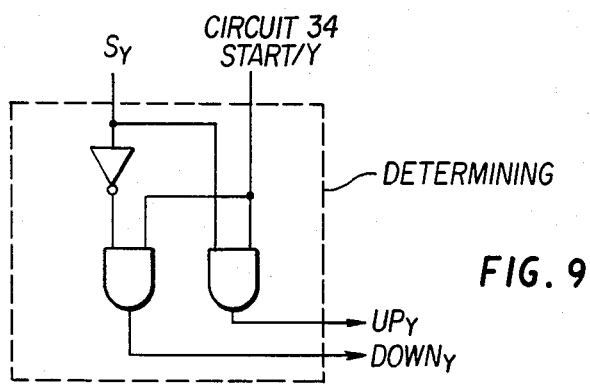
FIG. 9 is a circuit diagram for the determining circuit of FIG. 6.

FIG. 6 shows a detailed block diagram of the Y-GEN 21, and FIG. 7 shows a detailed block diagram of the X-GEN 22. In FIG. 6 a register 31 is initially set at the difference between the Y coordinates ($\Delta Y$) of the two points $P_1$ and $P_2$ and a sign bit $S_y$. $\Delta Y$ is the absolute value of the difference ($Y_2-Y_1$), the sign bit $S_y$ is "1" if $Y_2-Y_1>0$ and is "0" if $Y_2-Y_1<0$ to indicate that the difference $\Delta Y$ is positive or negative. A $Y_t$ controller 32, using the binary counter and gate circuit arrangement shown in FIG. 8, determines whether to change the Y coordinate or not on the basis of the difference $\Delta Y$, if the X-GEN 22 does not output the inhibiting signal (DIS), namely, when the shading circuit finds the new point $P_t$ on the line $L_1$. The $Y_t$ controller 32 outputs the control pulse in synchronization with the clock signal $CLK_1$ if a change in the Y coordinates is determined. The control pulse is transferred to the X-GEN 22 as the start signal (START/Y). A counter 33 detects when the Y coordinate ($Y_t$) of the point $P_t$ becomes coincident with the Y coordinate ($Y_2$) of the point $P_2$. The counter 33 is initially set at the difference $\Delta Y$. The control pulse from the $Y_t$ controller decrements the contents of the counter 33 each time it outputs. If the contents of the counter 33 becomes zero, the counter 33 outputs the zero detecting signal as a stop signal (SIOP/Y) to the X-GEN 22. The determining circuit 34 determines whether it increments the Y coordinates or it decrements them. The determining circuit 34, using the gate circuit arrangement shown in FIG. 9, outputs a count up signal ($UP_y$) or a count down signal ($DOWN_y$) at the timing of the control pulse in accordance with the logical state of the sign bit ($S_y$). A counter 35 generates the Y coordinates of the lightened point. The counter 35 is initially set to the $Y_1$ coordinate of the point ($P_1$). The contents of the counter 35 are incremented or decremented every pulse in responding to the count up signal ($UP_y$) or the count down signal ($DOWN_y$), respectively.

In FIG. 7, a register 41 is initially set with a sign bit $S_x$ and the difference ($\Delta X$) between the two points $P_1$ and $P_2$. $\Delta X$ is an absolute value of the difference between the two coordinates ($X_2-X_1$) with a sign bit ($S_x$) which indicates either a positive or negative difference ($X_2-X_1$). In this embodiment, if the difference ($X_2-X_1$) is positive the sign bit is equal to "1" and if the difference ($X_2-X_1$) is negative the sign bit $S_x$ is equal to "0". An $X_t$ controller 42, having the circuit arrangement shown in FIG. 8, and corresponding to the $Y_t$ controller 32, determines a change in the X coordinates in accordance with the difference $\Delta X$ of the register 41. The $X_t$ controller 42 outputs a control pulse in synchronization with the clock signal $CLK_1$, after it determines a change. A counter 43 corresponds to the counter 33 and detects the coincidence of the X coordinate ($X_t$) of the point $P_t$ with the X coordinate ($X_2$) of the point $P_2$. The counter 43 is initially set at the difference $\Delta X$. The control pulse from the $X_t$ controller 42 decrements the contents of the counter 43 by one at each control pulse. If the contents of the counter 43 is equal to zero, the counter 43 outputs a zero detecting signal as a stop signal (STOP/X) to the operation controller 49. A counter 44 generates the X coordinates of the lightened point and is initially set with the X coordinate ($X_1$) of the point $P_1$. The contents of the counter 44 are incremented by one by each count up signal ($UP_x$) from the operation controller 49 or they are decremented by one by each count down signal ($DOWN_x$) from the operation controller 49. The counter 44 is loaded with the saved contents of the register 45 according to the timing of a load signal ($LOAD_1$) from the operation controller 49. The register 45 saves the contents of the counter 44 according to the timing of a load signal ($LOAD_2$) from the operation controller 49.

Figure 10:
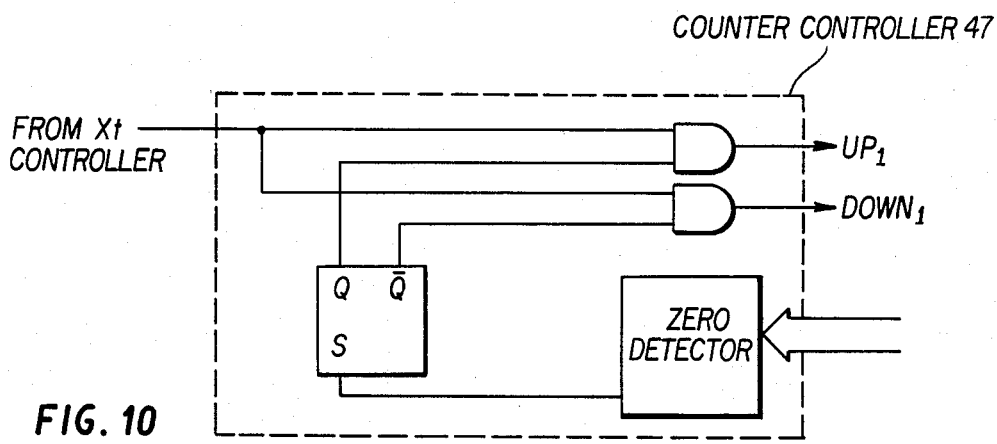
FIG. 10 is a circuit diagram for the counter controller of FIG. 6.

A counter 46 counts the number $\Delta X_{B+}(=X_3-X_t)$ of the sections to be lightened between the line $L_2(X=X_3)$ and the line $L_1$. A counter controller 47 controls the counting of the counter 46 with the logic circuit shown in FIG. 10 as described hereinafter. The counter controller 47 outputs count up signals ($UP_1$) or count down signals ($DOWN_L$) whenever the $X_t$ controller 42 outputs the control pulses. The counter controller 47 outputs the count down signals ($DOWN_1$) until it receives the zero detecting signal from the counter 46, at which it becomes zero, and then the counter controller 47 outputs the count up signals ($UP_1$) after it receives the zero detecting signal.

A counter 48 detects when the shading for a horizontal shading line is finished. The counter 48 is loaded with the contents of the counter 46 in responding to a load signal ($LOAD_3$) from the operation controller 49 for shading the each horizontal line. The contents of the counter 48 are decremented whenever the X coordinate of the lightened point is incremented or decremented. Namely, the contents of the counter 48 are decremented by the count down signal ($DOWN_2$) from the operation controller 49 at the same time as the count up signal ($UP_x$) or the count down signal ($DOWN_x$)

Figure 11:
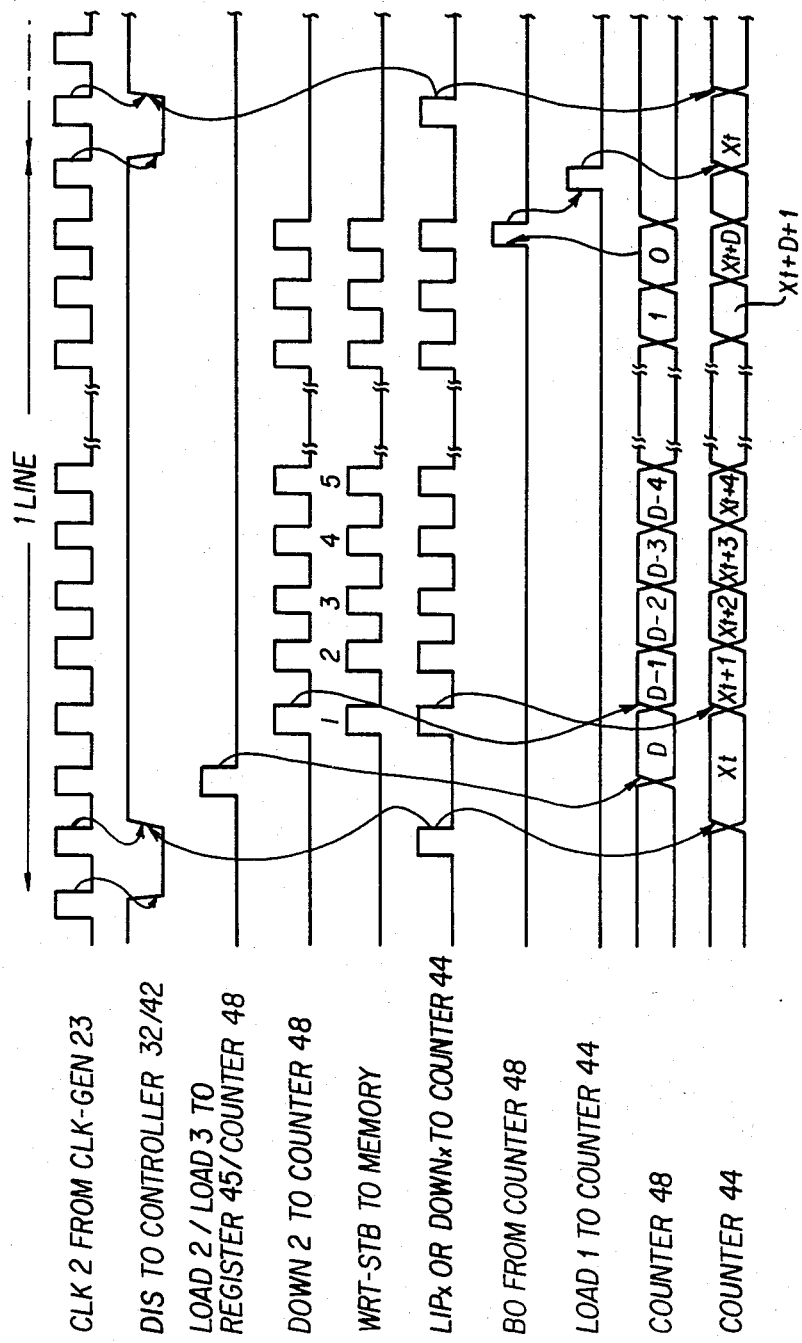
FIG. 11 is a timing chart illustrating the operation of the operation controller of FIG. 7.

The operation controller 49, which is designed to provide its functions in accordance with the timing chart shown in FIG. 11 and described more fully hereinafter, controls all of the shading circuit 13 to write the lightening information to the memory 12. The operation controller 49 has inputs for the clock signal $CLK_2$ from the GLK-GEN 23, the start signal (START/Y) and the stop signal (STOP/Y) from the Y-GEN 21, the sign bit $S_x$ of the register 41, the control pulse from the $X_t$ controller 42, the stop signal (STOP/X) from the counter 43, the zero detecting signal from the counter 46, and the borrow signal from the counter 48. The operation controller 49 outputs the inhibiting signal (DIS), the write-strobe signal (WRT-STB), the count up signal ($UP_x$), the count down signal ($DOWN_x$, $DOWN_2$), and the load signals ($LOAD_1$-$LOAD_3$) in responding to the various inputs.

Now there will be explained hereinafter the operations of the preferred embodiment in referring to the FIG. 4. In case of shading a region defined by the line $L_1$ connecting the point $P_1$ ($X_1$, $Y_1$) to the point $P_2$ ($X_2$, $Y_2$) and the line $L_2$ ($X=X_3$) which is parallel to the Y axis, first the various registers and counters in the shading circuit 13 must be designed. Namely, a processor or a host computer which is not shown initially determines and sets the difference $\Delta Y$ and the sign bit $S_y$ at the register 31 in the Y-GEN 21 and the coordinate $Y_1$ at the counter 35. In the case of FIG. 4 the difference is negative ($Y_2-Y_1 \geq 0$), therefore, the sign bit $S_y$ indicates a negative symbol ($S_y=0$). The processor or host computer also initially determines and sets the difference $\Delta X$ and the sign bit $S_x$ at the register 41 in the X-GEN 22, the $\Delta X$ at the counter 43, the coordinate $X_1$ at the counter 44, and the difference $\Delta X_B(X_3-X_1)$ at the counter 46. For any horizontal shading line between the lines $L_1$ and $L_2$ starting from the point Pt, the difference $\Delta X_{Bt}(X_3-X_t)$ is the number of sections to be lightened (i.e. the number of lattice points minus one), and the difference $\Delta X_B$ is the number of sections to be lightened ($X_3-X_1$) in the case of the horizontal shading line starting from the point $P_1$ on the line $L_1$ to the line $L_2$. It is apparent from FIG. 4 that since the difference ($X_2-X_1$) is positive, the sign bit $S_x$ is "1". In this embodiment the shading between the two points $P_1$ and $P_2$ will be determined by starting from the point $P_1$. It is also apparent from the FIG. 4 that when the two lines $L_1$ and $L_2$ intersect each other, it does not matter which point $P_1(P_2)$ is selected as the starting point. However, if the two lines $L_1$ and $L_2$ do not intersect, it is necessary to start at the point $P_1$ instead of the point $P_2$. This is necessary because the counter controller 47 controls the count down of the counter 46 at the beginning of the shading until the counter 46 outputs the zero detecting signal. After the processor initializes the system, it starts the operation controller 49, readying the shading circuit 13 for operation.

Shading for horizontal lines will be determined by taking the point $P_1$ first. For shading a horizontal line, the operation controller 49 outputs the inhibiting signal (DIS). When the inhibiting signal (DIS) is input to the $Y_t$ controller 32 and the $X_t$ controller 42, it inhibits the operation of both of them. Then the operation controller 49 outputs the load signal (Load 2) and (Load 3) in synchronization with the clock signal ($CLK_2$). As a result of the above mentioned operations, the register 45 saves the contents ($X_1$) of the counter 44, and the counter 48 saves the contents ($\Delta X_B$). After these operation, the operation controller 49 determines the X coordinate of each point of the horizontal line and outputs the write strobe signal (WRT-STB) to write the lighten information.

These operations are explained in more detail hereinafter. The initial lighten information is written to the corresponding address locations of the memory for the point $P_1$ ($X_1$, $Y_1$). After the saving operation of the register 45 and the counter 48, the operation controller 49 performs the writing operation to output the write strobe signal (WRT-STB). At that time it is apparent that the counter 35 is outputting the $Y_1$ coordinate and the counter 44 the $X_1$ coordinate. Then the operation controller 49 increments or decrements the counter 44 in response to the logical value of the sign bit ($S_x$) in the register 41. In this case since the sign bit is equal to "1", the operation controller 49 outputs the count-up signal ($UP_x$) to the counter 44. Therefore, the counter 44 is incremented and the prior content $X_1$ becomes $X_1+1$. The operation controller 49 also outputs the count-down signal ($DOWN_2$) to the counter 48 at the same time as it outputs the count-up signal ($UP_x$). Therefore, the counter 48 is decremented, and the contents $\Delta X_B$ becomes $\Delta X_B-1$. Thereafter, the operation controller 49 outputs the write strobe signal (WRT-STB) again, and writes the lighten information of the next point to the right of the point $P_1$ to the memory 12. The contents ($\Delta X_B-1$) of the counter 48 shows the number of remaining points which make up the horizontal line, including the point $P_1$. When the contents ($\Delta X_B$) of the counter 48 becomes equal to zero after repetition of the above explained operation, the counter 48 outputs the borrow signal in response to the count-down signal ($DOWN_2$). After that the operation controller 49 recognizes the completion of the shading operation for a horizontal line, and it momentarily interrupts the shading operation. The operation controller 49 outputs the load signal ($LOAD_l$) to the counter 44 which is loaded with the contents $X_1$ which was saved in the register 45.

Following these operations, the coordinates for the next point $P_t$ on the line $L_1$ for the shading of succeeding horizontal lines will be determined.

At first, the operation controller 49 outputs the inhibit signal (DIS). After that the $X_t$ controller 42 and the $Y_t$ controller 32 begin to operate in synchronization with the clock signal ($CLK_1$). The $Y_t$ controller 32 determines if the Y coordinate has to be changed based on the difference $\Delta Y$. When the $Y_t$ controller 32 determines to change the Y coordinate, it outputs the control pulse which is input to the counter 33 and the determining circuit 34 and is input as the start signal (START/Y) to the operation controller 49 in the X-GEN 22. The counter 33 counts in responding to the control pulse and its contents are decremented to $\Delta Y-1$. The contents of the counter 33 shows that the number of horizontal lines remaining to be shaded is one less. Also in responding to the control pulse, the determining circuit 34 controls the counter 35 to count up or count down based on the logical value of the sign bit $S_y$ in the register 31. In this case, $S_y$ is equal to zero and the circuit 34 outputs the count down signal ($DOWN_y$) to the counter 35. The contents $Y_1$ of the counter 35 are therefore decremented by one.

On the other hand, the $X_t$ controller 42 determines whether to change the X coordinates based on the difference $\Delta X$ in the register 41. If the $X_t$ controller 42 determines to change the X coordinates, it generates the control pulse. This control pulse is input to the counter 43, the counter controller 47 and the operation controller 49. The operation controller 49 operates in response to the control pulse and controls the count up or count down counter 44 based on the logical value of the sign bit $S_x$ in the register 41. In this case, since the sign bit $S_x$ is equal to zero, the operational controller 49 outputs the count up signal ($UP_x$) to the counter 44. Therefore, the contents of the counter 44 is incremented one. The contents ($\Delta X$) of the counter 43 is decremented also by the control pulse. The counter 47 outputs the count down signal ($DOWN_1$) to the counter 46 in responding to the control pulse. Then the contents ($\Delta X_B$) of the counter 46 is decremented one. Herein, after the counter 46 outputs the zero detecting signal, the counter controller 47 outputs the count up signal ($UP_1$) in response to the control pulse.

After the operation controller 49 operates the counter 44 and the counter 48 in responding to the control pulse as mentioned above, it outputs the inhibiting signal (DIS) as if it had completed the determination of all of the sections of the first horizontal shading line to be lightened.

The starting point for the next shading line is the closest point to the point $P_1$ on the simulated line of the line $L_1$. Although if the operation controller 49 does not receive a control pulse input from the $X_t$ controller 42, namely, if the X coordinate does not change, but it receives a start signal (START/Y) input from the $Y_t$ controller, namely, if the Y coordinate changes, it outputs the inhibiting signal (DIS), as if it had also completed the determining of the starting point for the next shading line at the predetermined timing. In that operation, there cannot be a control pulse from the $Y_t$ controller 32 or from the $X_t$ controller 42.

The operation controller 49 outputs the inhibiting signal (DIS) to the $Y_t$ controller 32 and the $X_t$ controller 42, inhibiting the operation of the $Y_t$ controller 32 and the $X_t$ controller 42, again. The contents of the counter 44 and the counter 35 are the respective coordinates ($X_t$, $Y_t$) of the starting point $P_t$ of the next horizontal shading line to be shaded (lightened), and the contents of the counter 46 represents the number of lattice points in the new horizontal shading line less one. The content of the counter 43 is the absolute value of the difference between the X coordinate ($X_t$) of the starting point $P_t$ for the next horizontal shading line and the X coordinate ($X_2$) of the point $P_2$.

The shading of the succeeding horizontal shading lines to that of the first point $P_1$ is then performed. The shading of the horizontal shading lines is performed one after another as mentioned above until the content of the counter 46 is equal to zero, when the counter 46 then outputs the zero detecting signal to the counter controller 47 and the operation controller 49. The counter controller 47 in response to the zero detecting signal signifying intersection of the line $L_1$ with the line $L_2$ and completion of the shading for the horizontal lines, outputs the count up signal ($UP_1$) to the counter 46 in response to the control pulse output from the $X_t$ controller 42. In this embodiment, namely, in the process of the repeated shading for the horizontal lines, it is possible to detect the completion of the shading operations and the intersection of the line $L_1$ with the line $L_2$ as signified by the zero detecting signal from the counter 46, without especially calculating the intersection. The counter controller 47 controls the increase to the contents ($\Delta X_B$) of the counter 46 by changing the count pulse. The operation controller 49 detects the completion of the shading for the horizontal lines and the intersection of the line $L_1$ and the line $L_2$ by means of the zero detecting signal from the counter 46. The operation controller 49 changes the counting direction to be able to shade the remaining horizontal lines always from the line $L_1$ to the line $L_2$, namely, on the horizontal shading. The operation controller 49 outputs the count down signal ($DOWN_x$) in synchronization with the clock signal ($CLK_2$) to make the X coordinate move toward the negative region as shown in FIG. 4. If the sign bit $S_x$ of the register 41 is zero, the operation controller 49 outputs the count down signal ($DOWN_x$) synchronized to the clock signal ($CLK_2$) at first, and after it detects the zero detecting signal from the counter 46, it outputs the count up signal ($UP_x$).

The shading will be repeated for the horizontal lines from the line $L_1$ to the line $L_2$ as mentioned above although the direction of the count is different. With these operations like the above repetitions, before the shading of a horizontal line begins, it is assumed that the contents ($\Delta X$) of the counter 43 is zero and the contents ($\Delta Y$) of the counter 33 is also zero. At that time both zero detecting signals of the counter 43 and the counter 33 are input to the operation controller 49 respectively as the stop signal (STOP/X) and the other stop signal (STOP/Y).

Herein, it is assumed that the contents of the counter 44 is $X_2$ which is the X coordinate of the point $P_2$ and the contents of the counter 35 is $Y_2$ which is the Y coordinate of the point $P_2$. Then the operation controller 49 outputs the write strobe signal (WRT-STB) at predetermined timing to write the lighten information into the corresponding address location of the memory 12 for the point $p_2$ whose coordinates are ($X_2$, $Y_2$) which are indicated by the counter 44 and the counter 35. Then the operation controller 49 outputs the count down signal ($DOWN_x$) to the counter 44 and also outputs the count down signal ($DOWN_2$) to the counter 48. Therefore the contents of the counter 44 and 48 are respectively decremented. After that, the counter 44 indicates the X coordinate of the starting point for the next horizontal shading line closest to the point $P_2$ along line $L_1$ and the counter 48 indicates the number of remaining points less one on the final horizontal shading line. The counter 44 and 48 are decremented whenever the memory 12 is written as mentioned above. After that, the counter 46 has been $X_3$ and the counter 48 has been "0". Thereafter the operation controller 49 outputs the write strobe signal (WRT-STB) at the predetermined time so that the shading circuit 13 writes the final lighten information to the memory 12 at the corresponding address location for the point $P_2$ ($X_2$, $Y_2$) on the line $L_1$ indicated by the counter 35 and 44. At this time, the operation controller 49 outputs the count down signal ($DOWN_2$) to the counter 48 again and the count down signal ($DOWN_x$) also to the counter 44 without noticing that the final coordinates have been written to the memory 12. Therefore the counter 48 becomes $-1$ and outputs the borrow signal to the operation controller 49. The operation controller 49 normally recognizes the completion of the shading for a horizontal shading line. However, in this case, the operation controller 49 cannot recognize that the shading for the final horizontal line is completed, because it has already received both of the stop signals (STOP/X) and (STOP/Y). Since the controller 49 cannot recognize the completion of the shading as stated above, it can be input to recognize the shading for the final horizontal line with a borrow signal from the counter 48 while it is input by both stop signals (STOP/X) and (STOP/Y). In response to the borrow the signal operation controller 49 stops its operation because the shading for the final horizontal shading line has beem completed.

As explained in this embodiment, it is possible to economize the operation time for the shading of the region between the line $L_1$ and the line $L_2$ without calculating the intersection $P_3$ of these lines. Although an example has been explained in the above case where the line $L_2$ intersects the line $L_1$, it is also possible to operate the same shading even though the lines do not intersect. Namely, the process of the operation is the same as the above mentioned embodiment, except that the operation controller 49 changes the count direction of the counter 44 and 46, because the counter 46 never outputs the zero detecting signal if the lines do not intersect. According to that embodiment, it is possible to perform the shading operations by uniform process of the common hardware regardless of the positional relationship between the lines $L_1$ and $L_2$.

As explained in the above mentioned embodiment the shading took place in the region between the line $L_1$ and the line $L_2$ which was parallel to the Y axis. However, it is easy to change the relation of the Y-GEN 21 and the X-GEN 22 that the shading takes place in the region between a line defined by two given points and the other line parallel with the X axis.

The invention is not only suitable for the character displays using the CRT monitor but also for same graphic display principles, for instance, used in the X-Y plotter.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A graphic display device for shading the region between the lines $L_1$ and $L_2$, comprising:
   a straight line coordinates generating means for generating plural coordinates in order from a point $P_1$ to a point $P_2$ defining a line $L_1$ which connects said two points $P_1$ and $P_2$;
   X or Y coordinates generating means electrically connected to said straight line generating means for counting X or Y coordinates from a point $P_t$ on said line $L_1$ given by said straight line coordinates generating means in a predetermined direction and for generating the X or Y coordinates of lattice points of said graphic display device to provide shading in order to define shading lines parallel to the X or Y axis of said graphic display device;
   control means, electrically connected to said straight line generator means and said X or Y coordinates generating means, for signalling said straight line coordinates generating means when the X or Y coordinates generating means completes the generation of the coordinates for a selected shading line;
   a display generating means, electrically connected to said straight line coordinates generating means and said X or Y coordinates generating means, for shading a region between said line $L_1$ and said line $L_2$ in accordance with said coordinates of said lattice points designated to provide shading as designated by said straight line coordinates generating means and said X or Y coordinates generating means for said shading lines;
   further comprising:
   a detecting means, electrically connected to said straight line coordinates generating means and said X or Y coordinates generating means, for detecting intersections of said line $L_1$ and said line $L_2$ in accordance with the number of said lattice points designated to provide shading on a selected shading line; and
   a changing means, electrically connected to said detecting means and said X or Y coordinates generating means, for changing the counting direction of said X or Y coordinates generating means after said detecting means detects an intersection of the lines $L_1$ and $L_2$.

2. A graphic display device, according to claim 1 or claim 3, wherein said detecting means includes a calculator means for defining the intersections of said lines.

3. A graphic display device for shading a region between first line and a second line by generating a plurality of shading lines, each said shading line comprising at least one lighted lattice point of said graphic display device, wherein said shading lines are generated in parallel relation to the mantissa or the ordinate of said graphic display device, comprising:
   straight line coordinates generating means for sequentially generating the coordinates of each point along said first line;
   shading line coordinates generating means, electrically connected to said straight line coordinates generating means, for counting the number of lattice points to be lighted along a selected shading line between said first line and second line and for generating the coordinates of said lattice points to be lighted;
   control means, electrically connected to said straight line generator means and said shading line coordinates generating means, for signalling said straight line coordinates generator means when said shading line coordinates generating means completes the generation of a selected shading line;
   display generating means, electrically connected to said straight line generating means and said shading line coordinates generating means, for shading the lattice points with respective coordinates designated by said straight line generating means and said shading line coordinates generating means;
   further comprising:
   detecting means, electrically connected to straight line coordinates generating means and said shading line coordinates generating means for detecting the intersection of said first line and said second line;
   count changing means, electrically connected to said detecting means and said shading line coordinates generating means, for reversing the counting direction of said shading line coordinates generating means in response to a signal from said detecting means.

4. A graphic display device, according to claim 3 wherein: said second line is parallel to said ordinate.

5. A graphic display device according to claim 3, wherein, said second line is parallel to said mantissa.

6. A graphic display device according to claim 1 or claim 3, wherein said graphic display is a cathode ray tube (CRT).

7. A graphic display device, according to claim 1 or claim 3, wherein said graphic display is an X-Y plotter.

8. A cathode ray tube (CRT) graphic display device for shading a region between a first line and a second line by generating a plurality of shading lines, each said shading line comprising at least one lighted lattice point of said graphic display device, wherein said shading lines are generated in parallel relation to the mantissa or the ordinate of said graphic display device, comprising:

straight line coordinates generating means for sequentially generating the coordinates of each point along said first line;

shading line coordinates generating means, electrically connected to said straight line coordinates generating means, for counting the number of lattice points to be lighted along a selected shading line between said first line and said second line and for generating the coordinates of said lattice points to be lighted;

control means, electrically connected to said straight line generator means and said shading line coordinates generating means, for signalling said straight line coordinates generator means when said shading line coordinates generating means completes the generation of a selected shading line;

display generating means, electrically connected to said straight line generating means and said shading line coordinates generating means, for shading the lattice points with respective coordinates designated by said straight line generating means and said shading ine coordinates generating means;

further including:

memory means electrically connected to said display generating means for storing lattice points data from said display generating means; and a cathode ray tube monitor means, electrically connected to said memory means, for displaying said data, whereby a plurality of cathode ray tubes may be driven.

* * * * *